United States Patent [19]

Chive et al.

[11] Patent Number: 4,583,869
[45] Date of Patent: Apr. 22, 1986

[54] METHOD AND APPARATUS FOR MEASURING THE TEMPERATURE OF A BODY IN MICROWAVES

[75] Inventors: Maurice Chive; Eugène Constant; Yves Leroy; Ahmed Mamouni, all of Villeneuve D'Asco; Michèle Robillard, Lille; Jean-Claude Van de Velde, Mons-en-Baroeul, all of France

[73] Assignee: Centre National de la Recherche Scientifique, Paris, France

[21] Appl. No.: 374,649

[22] Filed: May 4, 1982

[30] Foreign Application Priority Data

May 5, 1981 [FR] France .................. 81 09281

[51] Int. Cl.$^4$ .................. G01K 1/00; G01J 5/52; A61N 1/40
[52] U.S. Cl. .................. 374/122; 128/653; 128/736; 343/450
[58] Field of Search .................. 374/122; 128/736, 633, 128/804, 653; 340/500; 250/342; 343/450

[56] References Cited

U.S. PATENT DOCUMENTS

| | | | |
|---|---|---|---|
| 2,399,674 | 5/1946 | Harrison | 374/122 X |
| 3,789,834 | 2/1974 | Duroux | 128/653 |
| 3,796,099 | 3/1974 | Shimotsuma et al. | 374/129 X |
| 4,204,549 | 5/1980 | Paglione | 374/122 X |
| 4,206,454 | 6/1980 | Schapira et al. | 340/600 X |
| 4,235,107 | 11/1980 | Lüdeke et al. | 374/122 |
| 4,246,784 | 1/1981 | Bowen | 374/117 |
| 4,295,475 | 10/1981 | Torzala | 128/736 |
| 4,311,154 | 1/1982 | Sterger et al. | 128/736 X |
| 4,346,716 | 8/1982 | Carr | 128/736 X |
| 4,379,461 | 4/1983 | Nilsson et al. | 374/112 X |
| 4,397,314 | 8/1983 | Vaguine | 128/736 X |
| 4,414,542 | 11/1983 | Farquhar et al. | 340/600 X |
| 4,416,552 | 11/1983 | Hessemer, Jr. et al. | 374/122 X |

FOREIGN PATENT DOCUMENTS

| | | | |
|---|---|---|---|
| 0094229 | 7/1981 | Japan | 374/122 |
| 0799726 | 8/1978 | U.S.S.R. | 374/122 |

OTHER PUBLICATIONS

"A New Radio Interferometer for and Its Application(s) to the Observation of Weak Sister Stars" by M. Ryle, Oct. 10, 1951, (revised), pp. 351–375, (book title unknown).
"Radio–Telescope Receivers", Martti E. Tiuri, Radio Astronomy–John D. Krauss, 1966, pp. 236–293.
"Electrical Characteristics of Waveguide Applications for Medical Applications", J. Audet et al, Journal of Microwave Power, 15(3), 1980, pp. 177–186.
"Electronics Dictionary", John Markus, pp. 104, 135, 468, 469, 614, and title page.
"A Modified Radiometer for Temperature and Microwave Properties of Biological Substances", by A. Momouri et al., Sep. 1977, pp. 703–707, European Microwave Conference.
Publ. "Subcutaneous Temperatures: A Method of Noninvasive Sensing", Nov. 11, 1975, Science, V190, pp. 669–671.

Primary Examiner—Daniel M. Yasich
Attorney, Agent, or Firm—Robert E. Burns; Emmanuel J. Lobato; Bruce L. Adams

[57] ABSTRACT

To measure the temperature of a sub-surface volume of a body, for example, living tissue, in microwaves, at least two probes are placed on or near the surface of the body to pick up thermal noise in the microwave range. The two probes are positioned so that the volumes of the body from which the respective probes receive thermal noise signals overlap to provide a common volume from which both of the probes receive thermal noise signals. The signals received by the probes are processed so as to be amplified and to accentuate the signals emitted by the common volume relative to the signals omitted by the remainder of the volumes from which the probes receive thermal noise signals. In one form of apparatus, the two probes are connected in parallel to a correlator the output of which is connected to an amplifier-receiver. In another form of apparatus the probes are connected to an amplifier-receiver, one being connected through a phase shifter. In still another form of apparatus, the two probes are connected through a summing device to a square-law detector, one of the probes being connected through a cyclical phase shifter which is synchronized with the square wave detector.

15 Claims, 10 Drawing Figures

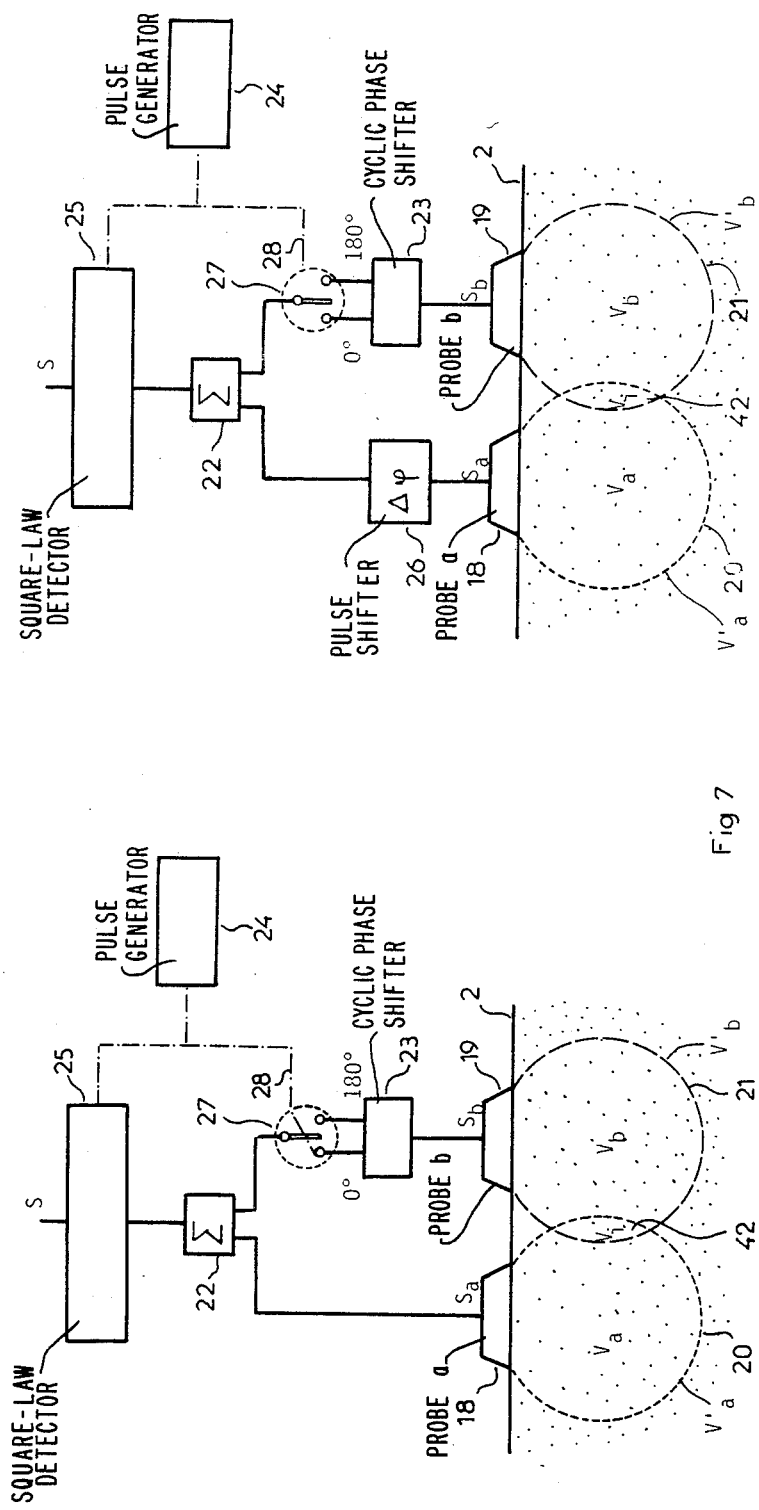
Fig 6
Fig 5
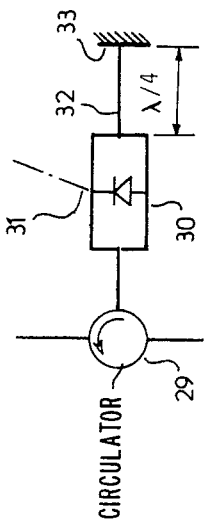
Fig 7

METHOD AND APPARATUS FOR MEASURING THE TEMPERATURE OF A BODY IN MICROWAVES

FIELD OF THE INVENTION

The invention concerns a method of measuring the temperature of a body by a special method based on microwave radiometry. To be more precise, the invention concerns a method of measurement of the temperature by a measurement of the thermal noise in the microwave range emitted by a material which makes it possible to have control of the volume of material under investigation and to obtain a better spatial resolution, as well as a device for carrying out the method. The method and apparatus of the invention are, for example, applicable to measuring subsurface temperature of living tissue to detect local deviation of temperature which may indicate the presence of a tumor or other abnormality.

BACKGROUND OF THE INVENTION

The existing methods of measuring the temperature of a body in microwaves consist of placing a probe in the vicinity of the surface of the body, or in contact with this surface, for the purpose of picking up the signals of thermal noise emitted by a volume of the body being investigated by the probe. The thermal noise signals are then amplified, processed if necessary, in such a manner as to output a signal which is a function of the temperature which prevails in the volume under investigation.

It must be noted that in such methods the volume under investigation depends on the nature of the body and on the characteristics of the probe used. Hence, for the same body, the volume under investigation remains approximately similar to itself, especially when the probe is displaced in relation to the surface of the body.

Hence, when the purpose of a device for carrying out one of the existing methods is to detect a possible local deviation of temperature, under the surface of a body, for example, of a living tissue, it will in fact be possible to locate this anomaly when it is included in the volume which is being investigated by the probe. However, it will be difficult, even impossible, to locate this anomaly within the volume under investigation.

Hence, diagrammatically, the spatial resolution of the existing devices is limited to the volume under investigation associated with the probe. In order to improve this spatial resolution, it is now possible to change the probe, in such a manner as to change likewise the volume associated with it. However, such a change requires manipulations and adjustments for adapting the chain of measurements to the new probe.

On the other hand, it must be noted that for a volume under investigation associated with a probe, the signals emitted by elementary volumes closest to the probe present, at the level of the latter, a greater weight than the signals emitted by elementary volumes which are further away. In other words, the signals emitted by elementary volumes close to the surface of the body mask those emitted by the rest of the volume under investigation.

SUMMARY OF THE INVENTION

One of the aims of the present invention is to provide a method of measuring temperature of a selected sub-surface volume of a body by measuring thermal noise signals in the microwave range emitted by the body, as well as a device for implementing the method, which make it possible to have control of the volume under investigation, without requiring a change of probe.

Another aim of the present invention is to provide a method and a device which make it possible to measure the temperature prevailing in a volume which forms part of volumes investigated by two probes, but which is reduced in relation to these, and to improve the spatial resolution.

Another aim of the present invention is to provide a method and a device which make it possible to vary the spatial resolution.

Other aims and advantages of the present invention will appear during the course of the description which follows, which is, however, only given as an indication, and does not aim to limit it.

The method of measuring the temperature of a selected sub-surface volume of a body according to the invention comprises placing at least two probes A and B near or in contact with a surface of the body to pick up thermal noise signals in the microwave range emitted by a volume of the body associated respectively with each probe. The probes are positioned ajacent one another so that the volumes of the body from which the respective probes receive thermal noise signals in the microwave range overlap one another to provide a common volume part Vi from which both of the probles receive thermal noise signals in the microwave range and remaining volume parts Va and Vb from which only the individual probes A and B respectively receive thermal noise signals in the microwave range. The signals received by the two probes are amplified and are correlated so that thermal noise signals in the microwave range emitted by the common volume part Vi are correlated while thermal noise signals in the microwave range emitted by the remaining volume parts Va and Vb are decorrelated so that thermal noise signals in the microwave range emitted by the common volume Vi are made preponderant by correlation with respect to the thermal noise signals in the microwave range emitted by the remaining volume parts Va and Vb from which the probes A and B respectively receive thermal noise signals in the microwave range.

Apparatus in accordance with the invention for measuring the temperature of a selected sub-surface volume of a body comprises at least two probes A and B adapted to be placed on or near the surface of such body to pick up thermal noise signals in the microwave range emitted by the body. The two probes are positioned adjacent one another so that the volumes of the body from which the respective probes receive thermal noise signals in the microwave range overlap one another to provide a common volume part Vi from which both of the probes receive thermal noise signals in the microwave range and remaining volume parts Va and Vb from which only probes A and B respectively receive thermal noise signals in the microwave range. The apparatus further comprises means for amplifying and correlating signals from the probes to correlate thermal noise signals in the microwave range received from the common volume part Vi while decorrelating thermal noise signals in the microwave range received from the remaining volume parts Va and Vb so as to accentuate the thermal noise signals in the microwave range emitted by the common volume part Vi with respect to the thermal noise signals in the microwave range emitted by the remaining volume parts Va and Vb from which the probes receive thermal noise signals in the microwave range.

The invention will be better understood if the description given below is referred to together with the drawings which form an integral part of it.

FIG. 1. shows in diagrammatic form a conventional method of measuring temperature in microwaves.

FIG. 2. is a diagram showing the principle of the invention.

FIG. 3. gives a diagrammatic representation of the method according to the invention, in one method of implementation.

FIG. 4. is a variant of the method relating to FIG. 3.

FIG. 5. is a diagram of another method of implementing the invention.

FIG. 6. is a variant of the diagram of FIG. 5.

FIG. 7. is a diagram of a variant of the means of cyclic phase shifting of 180°.

FIG. 8. further illustrates the method according to FIGS. 5 and 6.

FIGS. 9. & 10 are diagrams of the modes of variation of the spatial resolution.

DESCRIPTION OF THE PREFERRED EMBODIMENTS

Figure 1:
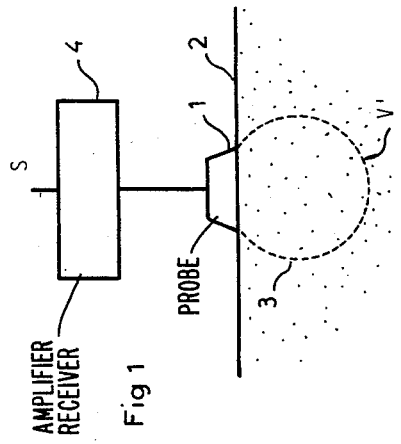

In FIG. 1. a conventional method of measuring temperature in microwaves is shown diagrammatically. In this method a probe 1 is placed in the vicinity of the surface 2 of a body, or in contact with this surface. The probe picks up the thermal noise signals emitted by a volume V' of the body, situated under its surface 2, which is known as the volume under investigation.

The volume V' is shown diagrammatically in FIG. 1. by the dotted line 3. It depends on the nature of the body, on the one hand, and on the characteristics of the probe 1 on the other hand.

The probe 1 is connected to an amplifier receiver 4, which amplifies the signals picked up by the probe, and emits a signal S which is a function of the temperature prevailing in the volume under investigation V'.

Figure 2:
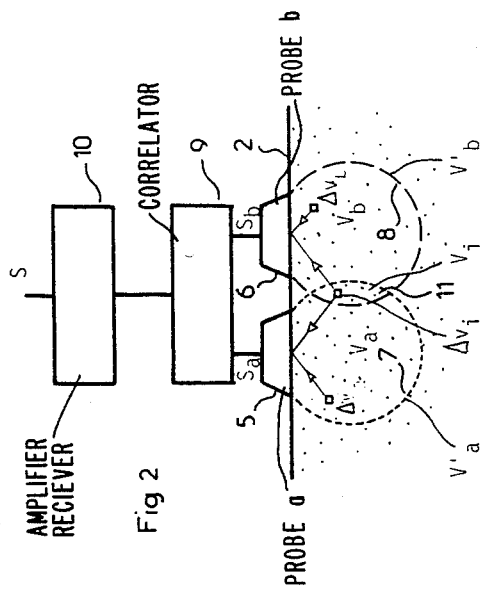
Figure 8:
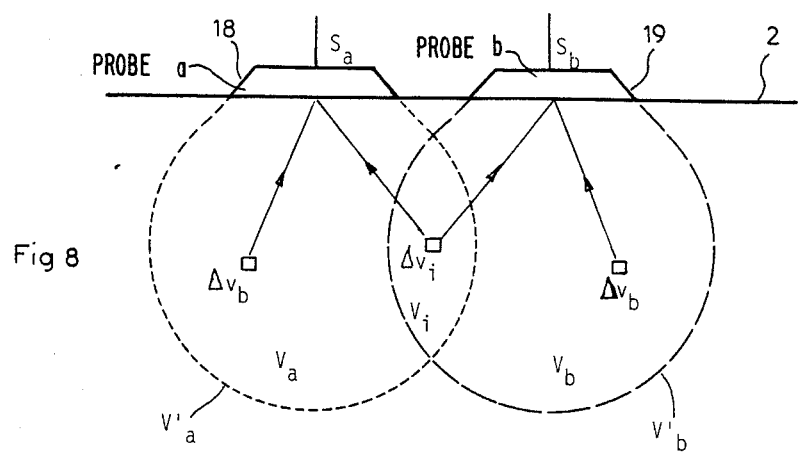

FIG. 2. relates to the diagram of the principle of the present invention. This implements at least two probes 5 and 6, which will also be designated as probe a and probe b. Each probe, 5 and 6, or a and b has its own sub-surface volume of investigation, 7 and 8 or $V'_a$ and $V'_b$.

In the same way as the preceding case, the volumes under investigation $V'_a$ and $V'_b$ depend on the nature of the body and the characteristics of the probes a and b.

According to the invention, the two probes a and b, or, more generally, the various probes, are arranged in such a manner that their respective volumes under investigation overlap so as to present an intersection which is not zero. Hence, in the case of FIG. 2 the volumes $V'_a$ and $V'_b$ present a common volume part $V_i$.

If the theory of sets is referred to, the volumes $V'_a$, $V'_b$, $V'_i$ are in accordance with the following equations:

$$V_i = V'_a \cap V'_b \quad (1)$$

$$V'_a = V_a \cup V_i \quad (2)$$

$$V'_b = V_b \cup V_i \quad (3)$$

In other words, for the volume under investigation $V'_a$ by the probe a, the signals proceeding from the various elementary volumes $\Delta v_a$ of the volume $V_a$ will be picked up solely by the probe a. The same applies to signals proceeding from the different elementary volumes $\Delta v_b$ of the volume $V_b$ which will be picked up solely by the probe b.

On the other hand, the signals emitted by the elementary volumes $\Delta v_i$ of the common volume $V'_i$ of the volumes under investigation, will be picked up by both the probe a and the probe b.

According to the invention the signals $S_a$ and $S_b$ picked up by the probes a and b respectively are processed in parallel by a correlator 9 also called a correlation-type receiver. At the level of this device, the signals emitted by the volumes $V_1$ and $V_b$ are "decorrelated", that is, they do not have any relationship to one another. On the other hand, the signals of thermal noises emitted by the common volume $V_i$ are "correlated", because they proceed from the same volume via different probes. The signals emitted by the common volume part are thereby made preponderant with respect to the signals emitted by the remainder of the volumes from which the probes receive thermal noise signals.

At the output of the correlator 9, the signals are processed by an amplifier receiver 10. If necessary, the correlator and amplifier receiver can be combined.

It must also be noted that the signals of thermal noises taken into consideration are situated in the area of microwaves, or hyperfrequencies, that is, frequencies approximately between 0.1 and 20 GHz inclusive and are of a random nature.

The present invention will be illustrated with two different variants of execution. In these two methods, the wave lengths and the phase shifting set forth are relative to the central frequency of the frequency band in which the thermal noise signals are processed and amplified. In fact, strictly speaking it would be necessary to extend the present argument to all the frequencies situated in the frequency band of the device.

Figure 3:
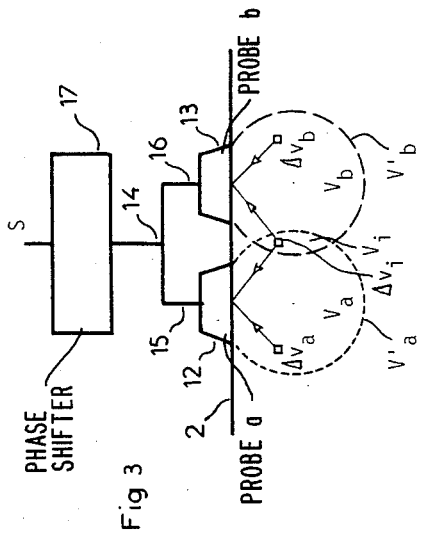
Figure 4:
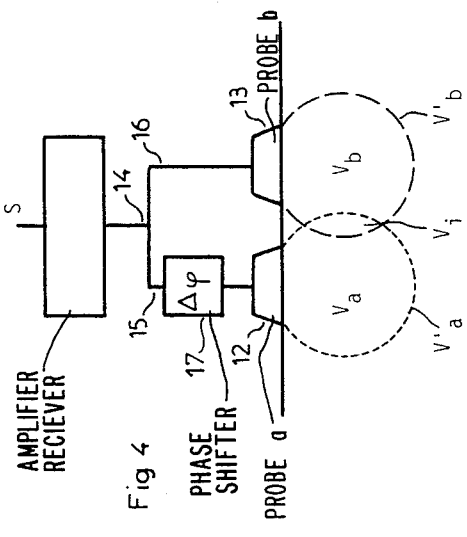

FIGS. 3 and 4 relate to a mode of carrying out the method according to the invention. For these figures, two probes a, b, designated respectively 12, 13, or more are arranged on the surface 2 of a body, in such a manner that their respective volumes under investigation $V'_a$ and $V'_b$ have a common volume $V_i$. The probes a and b are electrically connected at 14. If necessary other probes are likewise connected at 14. The electrical paths 15 and 16 separating the probes from the connecting point 14 are approximately identical. The connection point 14 is electrically connected to an amplifier receiver 10 of a known type, which emits a signal S.

The inventors have noticed that when two probes are connected electrically in parallel, without their volumes under investigation presenting a common part, the power of the signals is of the same order as the power of the signals which would be picked up by a single probe. Thus, the power of the signals picked up by each of the probes does not add up arithmetically, but is approximately the half-total of the powers picked up by each of the probes, which is transmitted to the amplifier receiver in the case of identical probes in the presence of an approximately uniform ambient temperature.

Hence, the contribution of an elementary volume, under investigation by one of the probes is approximately divided into two, when two probes are used, compared with the case in which a single probe is connected to the amplifier receiver.

The inventors think that this phenomenon originates from the electrical communication between the probes, and from the losses of power at the level of the connector 14.

In the case of FIG. 3, the thermal noise signals proceeding from the volume $V_a$ are picked up solely by the probe a. The same applies to the volume $V_b$ with the probe b. On the other hand, the elementary volumes $\Delta v_i$ of the common volume $V_i$ are picked up both by the probe a and probe b. Hence, approximately the elementary volumes $\Delta v_i$ of the volume $V_i$ can present a contribution which is double those of the elementary volumes of the volumes $V_a$ and $V_b$. The signals proceeding from $V_a$ and $V_b$ are in some measure effaced with regard to the signals proceeding from the volume $V_i$. The greater the number of probes, the more this phenomenon is accentuated, in view of the fact that the contribution of each of the probes is approximately divided by the number of probes, compared with the case in which a single probe is connected to the amplifier receiver.

This is only approximate, for the thermal noise signals emitted by an elementary volume $\Delta v_i$ of the common volume $V_i$ in the direction of the probes a, b, do not add up arithmetically at the level of the point of electrical connection 14. In fact, a phase shift exists between the two signals, owing to the difference in distance between the volume $\Delta v_i$ and the probes a and b.

Beyond the connection point 14, the power $S'$ of the signal is approximately in accordance with the following equation:

$$S' = \Sigma V_a k_a \cdot A_a^2 \cdot T_a + \Sigma V_b k_b \cdot B_b^2 \cdot T_b + \Sigma V_i k_i A_i B_i T_i \cos \theta_i \quad (4)$$

In this equation $k_a$, $k_b$, $k_i$ designated constants. $A_b$, $B_b$, $A_i$ and $B_i$ designate respectively the coefficients of transmission of the electrical field between the elementary volumes $\Delta v_a$, $\Delta v_b$, $\Delta v_i$ and their associated probes a and b. $T_a$, $T_b$, $T_i$ designate respectively the temperatures prevailing in the elementary volumes $\Delta v_a$, $\Delta v_b$, $\Delta v_i$.

The first term of the equation (4) is the contribution of the volume $V_a$, the second is that of the volume $V_b$ and the third that of the volume $V_i$. In this third term $\theta_i$ designates the dephasing between the signals emitted respectively towards the probes a and b for the average frequency of measurement. This dephasing is expressed by $$\theta_i = 2\pi \cdot f \cdot \tau_i \quad (5)$$

where f designates the frequency and $\tau_i$ the delay between the two signals.

Hence, in the signal $S'$, the first two terms relating to the volumes $V_a$ and $V_b$ are independent, the signals of thermal noises proceeding from these two volumes are decorrelated. On the other hand, in the third term, the signals proceeding from the volume $V_i$ are correlated, and a phase shift $\theta_i$ intervenes.

FIG. 4 is a variant of FIG. 3, according to which a phase shifter 17 has been introduced into one of the electrical lines, for example line 15, on this side of the connection point 14. This dephaser introduces a phase shift $\Delta \theta$ into the signal of the probe.

In equation (4) of the signal $S'$, the first term remains overall unchanged, and the phase shift $\Delta \theta$ takes place at the level of the third term which is now written.

$$\Sigma V_i k_i \cdot A \cdot B_i \cdot T_i \cos (\theta_i + \Delta \theta) \quad (6)$$

Thus the phase shift $\Delta \theta$ makes it possible to vary the correlation between these signals proceeding from the volume $V_i$. In other words, the phase shift $\Delta \theta$ varies in particular the zones of the common volume $V_i$ for which the cosine is approximately zero and those for which the cosine is close to 1.

Thus the electrical coupling of probes in parallel achieves a correlation between the signals emitted by the volume common to the different volumes being investigated by the probes. Owing to this fact the contribution of the common volume to the final signal can be more important than that of the volumes such as the volumes $V_a$ and $V_b$. The specialist will easily extrapolate the present reasoning to the case in which more than two probes are electrically connected.

FIGS. 5–8 are concerned with another implementation of the invention. According to this implementation, the signals of thermal noises proceeding from the above volumes $V_a$ and $V_b$ have an approximately zero contribution to the final signal, and only the thermal noise signals originating from the common volume $V_i$ intervene in this signal.

The diagram of the principle is given in FIG. 5, for the case in which two probes are used.

Two probes a and b, designated 18 and 19 respectively are arranged in the vicinity of the surface 2, or in contact therewith. They present a volume under investigation $V'_a$ and $V'_b$, 20 and 21 respectively which have a common part $V_i$, 42.

One of the probes, for example, the probe a, is connected to means of summation 22, such as a T. The probe b is connected to the summation means, via cyclic phase shifting means 23. These cyclic phase shifting means are controlled by a pulse generator 24, which imparts to them a cyclic ratio equal to ½. The phase shifting means 23 effects a phase shift of 180° and is thus a phase inverter.

At the output of the phase shifting means 23, the signal $S_b$, proceeding from the probe b, is phase shifted by 0° on a half-period of the pulse generator and by 180° on the following half period.

At the output of the summating means 22, the signal is processed by means 25, which consist for example, of a large gain and low noise square-law detector. The square-law detector achieves an elevation to the square of the input signal of the processing means 25.

Moreover, the pulse generator 24 likewise controls at the level of the processing means 25, a detection which is synchronous to the cycle of the cyclic phasing shifting means 23 to output a signal approximately proportional to the difference in amplitude of the signal corresponding to the two half periods of the phase shifting cycle.

It can be shown that at the output of the processing means, the signal S is presented in the form:

$$S_1 = \Sigma V_a k_a \cdot A_a^2 \cdot T_a + \Sigma V_b k_b \cdot B_b^2 \cdot T_b + \Sigma V_i k_i \cdot [A_i^2 + B_i^2 + 2 \cdot A_i B_i \cos \theta_i] \cdot T_i \quad (7)$$

on the half-period where the signal originating from the probe b is shifted by 0 degrees by the phase shifting means 23, and $$S_2 = \Sigma V_a k_a \cdot A_a^2 \cdot T_a + \Sigma V_b k_b \cdot B_b^2 \cdot T_b + \Sigma V_i k_i [A_i^2 + B_i^2 + 2 \cdot A_i B_i \cos (\theta_i + 180°)] T_i \quad (8)$$

on the half-period in which the signal which proceeds from the probe $S_b$ is shifted by 180° by the phase shifting means 23.

The above equation (8) can be transformed. It becomes $$S_2 = \Sigma V_a k_a \cdot A_a^2 \cdot T_a + \Sigma V_b k_b \cdot B_b^2 \cdot T_b \\ + \Sigma V_i k_i [A_i^2 + B_i^2 - 2 \cdot A_i \cdot B_i \cos \theta_i] \cdot T_i \quad (9)$$

In the equation of $S_2$ the shift of 180° does not take place at the level of the second term, for the signal which proceeds from the probe b, phase shifted by 180°, is raised to the square by the square law detector.

In the above formulae, as in relation to the first method of implementation, $k_a$, $k_b$, $k_i$ are constants which depend on the nature of the body, on the characteristics of the probes and on other parameters. $A_a$, $B_b$, $A_i$ and $B_i$ are coefficients of transmission of the electrical field, respectively of the elementary volume $\Delta v_a$ towards the probe a, of $\Delta v_b$ towards the probe b, and $\Delta v_i$ towards the probe a and the probe b as shown diagrammatically in FIG. 8. $T_a$, $T_b$ and $T_i$ are the temperatures prevailing in the elementary volumes $\Delta v_a$, $\Delta v_b$ and $\Delta v_i$ respectively.

The variable $\theta_i$ designates the phase shift between the signals originating from the volume $\Delta v_i$ via the probe a on the one hand and via the probe b on the other hand. In the equation (8), this phase shift is increased by 180° owing to the phase shifting means 23.

The signals $S_1$ and $S_2$ are processed by any suitable means, and for example by a synchronous detection or by a numerical filtering, in such a manner as to output a signal S which is approximately proportional to the difference in the amplitude of the signal corresponding to two half periods of the phase shifting cycle and thus approximately equal to the distance between the signals $S_1$ and $S_2$. This signal S hence assumes approximately the following form:

$$S = \Sigma V_i k'_i \cdot A_i \cdot B_i \cos \theta_i \cdot T_i, \quad (10)$$

where $k'_i$ is equal to $k_i$ at approximately a multiplicative constant. Thus the means of processing have considerably eliminated the signals proceeding from the volumes $V_a$ and $V_b$, and the signal S only depends on the signals emitted by the volume $V_i$ which is common to the two volumes which are being investigated.

It must be noted that the above equations take into account the random nature of the signals emitted by the different elementary volumes. They take into account equally the first that the signals emitted by the volumes $V_a$ and $V_b$ are independent or decorrelated and that the signals emitted by the common volume $V_i$ in the direction of the probes a and b are correlated.

Moreover, preferably the electrical paths of the two probes a and b at the summation means 22, when the phase shifting means 23 output a signal with a zero phase shift, are approximately equal.

FIG. 6. illustrates diagrammatically a variant of FIG. 5 according to which the adjustable phase shifting means 26 are introduced into the electrical circuit of one of the probes, for example, of the probe a. These means introduce a variable phase shift $\Delta\theta$, which has repercussions on the final dephasing, which becomes:

$$S = \Sigma V_i k'_i \cdot A_i \cdot B_i \cos (\theta_i + \Delta\theta) \cdot T_i \quad (11)$$

the phase shift $\Delta\theta$ modifies the weight of the different elementary volumes of the volume $V_i$ in the final signal. It thus modifies the correlation relation.

The phase shifting means are represented in FIGS. 5 and 6 in the form of a coupler of 180°, which has two outputs. On one of these outputs, marked 0°, the phase of the signal is not shifted. On the other output, marked 180 degrees, the signal is in phase opposition in relation to the input signal. A microwave switch 27 connects the two outputs of the 180° coupler cyclically to one of the inputs of the summating means 22. This switch 27 is controlled by the pulse generator 24 which is shown diagrammatically by the dot-dash line 28. The pulse generator 24 also controls the square-law detector 25 so that the square-law detector is synchronized with the cyclical phase inventor 27.

Other phase shifting means 23 are shown in FIG. 7. They consist of a circulator 29 which is placed in the connection of the probe to the summation means 22 and which diverts the signal in the direction of a reflective modulator 30. This modulator has two states, and is controlled by the pulse generator 24 as shown diagrammatically by the dot-dash line 31.

In one of these states the modulator 30 operates in short circuit and sends back the signal in the direction of the circulator, which sets off again in the direction of the summation means. This corresponds to a zero phase shift.

In the other state, the modulator 30 sends a signal on a line 32 which ends in a short circuit 33. The line 32 presents a length which is equal to a quarter of the wavelength corresponding to the central measuring frequency. Thus the signal passes along the lines 32, is reflected by the short circuit 33, returns in the direction of the modulator 30 then in the direction of the circulator 29. Thus, in relation to the previous state, it has passed over, a distance which is approximately equal to a half wavelength, which phase shifts it by 180°.

The present mode of implementing the invention has been described with two probes. This mode of implementation can be extrapolated and more than two probes could be connected to the means of correlation which have just been described. In this case the supplementary probes are connected to the summator via cyclic phase shifting means of 180°. The phase shifting means of the different probes are controlled in such a manner that, when considering two signals proceeding from any two probes, these signals are in phase on a half-period of the phase shifting means, and in phase opposition on another half-period. The half periods express an overall duration with respect to the cycle of the phase shifting means, and can be formed of fractions of periods which are not necessarily continuous.

Thus according to the first method of implementation of the invention, the weight of the common volume is increased with respect to the rest of the volumes under investigation. On the other hand, in the second mode of implemenetation of the invention, the output signal depends perceptibly only on the temperature prevailing in the volume common to the two volumes under investigation. The common volume $V_i$ hence becomes the new volume under investigation. It has a more reduced volume than the volumes under investigation $V'_a$ and $V'_b$ in view of the fact that it consists of the intersection of these volumes. On the other hand, it must be noted that the phase shift $\Delta\theta$ makes it possible to "explore" this common volume $V_i$ in a different manner.

Figure 9:
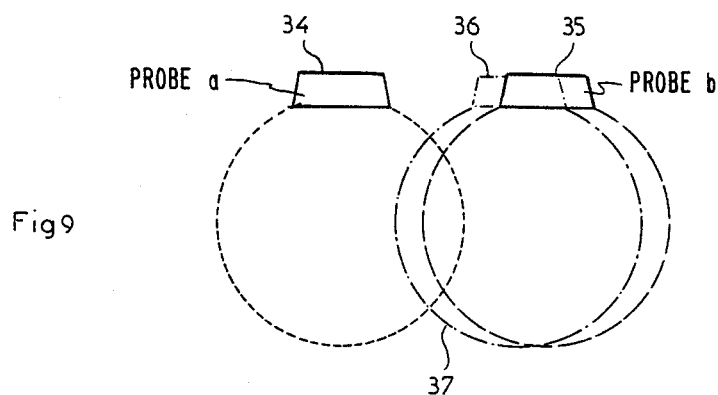
Figure 10:
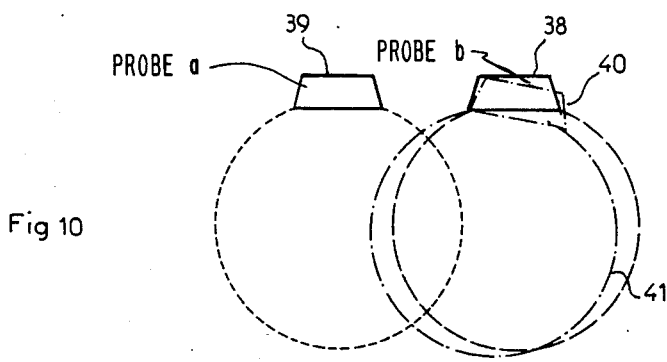

FIGS. 9 and 10 show diagrammatically the modification of the common volume $V_i$. In FIG. 9 this modification is obtained by displacing the probe b 35 by translational movement in relation to the probe a 34. The new position of the probe b is shown diagrammatically by the dot-dash line 36 and its volume under investigation by the dot-dash line 37. In the case of FIG. 9, a relative approaching of the two probes increases the common volume under investigation.

FIG. 10 shows diagrammatically another modification of the common volume under investigation, which is obtained by the rotation of the probe b 38, its new position being shown diagrammatically by the dot-dash line 40, and its new volume under investigation by the dot-dash line 41. As emerges from this figure, the common volume varies, owing to rotation of the probe b 38 in relation to the probe a 39.

Naturally a combination of a rotary and a translational movement likewise modifies the common volume under investigation $V_i$.

On the other hand, it must be noted that, advantageously, if it is accepted that the volumes under investigation are approximately of the shape which is shown diagrammatically in the figures, or at least display a divergent form in the vicinity of the probe, the common volume under investigation is deeper, at least in its upper part, than the respective volumes being investigated by each probe. Hence it is possible to eliminate, or at least to reduce, the effect of the surface signals in relation to the depth signals.

Moreover, the parasitic signals proceeding from the vicinity of the probe can be eliminated, or at least greatly weakened owing to the combination which is established.

The present invention hence makes it possible to improve the spatial resolution of a temperature measuring device in microwaves, without having to interchange the probe, and, on the other hand, to vary this spatial resolution, simply by displacing one of the probes in relation to the other. Moreover, it would be possible to operate in different frequency bands in order to obtain additional information.

In the two modes of implementing the invention, it is possible to obtain an output signal which is approximately porportional to the temperature prevailing in the volumes under investigation, and especially as far as the second mode described is concerned, to the temperature prevailing in the common volume under investigation. The invention can be combined with existing devices especially for the visualisation and calibration of the output signal. Thse devices have not been described and are within the reach of the specialist.

The invention can have numerous applications, in the medical field, for example, for locating subcutaneous abormalities. It is also suitable for application in the agricultural foodstuffs area, and, in general, within the framework of temperature measurement.

Naturally, the present description is only given as an indication, and it could be adapted to other applications of the invention without, however, going outside the framework of the invention.

What we claim is:

1. Method of measuring the temperature of a selected sub-surface volume of a body which comprises placing at least two probes A and B near or in contact with a surface of the body to pick up thermal noise signals in the microwave range emitted by a volume of the body associated respectively with each probe, positioning said probes adjacent one another so that the volumes of the body from which the respective probes receive thermal noise signals in the microwave range overlap one another to provide a common volume part Vi from which both of said probes receive said thermal noise signals and remaining volume parts Va and Vb, from which only the individual probes A and B respectively receive thermal noise signals in the microwave range, amplifying said signals received by said probes and correlating said signals so that thermal noise signals in the microwave range emitted by the common volume part Vi are correlated while thermal noise signals in the microwave range emitted by remaining volume parts Va and Vb are decorrelated, whereby thermal noise signals in the microwave range emitted by said common volume Vi are made preponderant by correlation with respect to thermal noise signals in the microwave range emitted by the remaining volume parts Va and Vb from which said probes A and B respectively receive thermal noise signals in the microwave range.

2. Method according to claim 1, in which said probes are coupled electrically in parallel with one another.

3. Method according to claim 2, in which the phase of signals from one of said probes is shifted relative to that of signals from the other of said probes.

4. Method according to claim 3, in which the phase shift value between the signals of the two probes is varied during the measuring.

5. Method according to claim 3, in which the phase of signals from one of said probes is cyclically shifted 180° relative to that of signals from the other of said probes with a cyclic ratio which is approximately equal to $\frac{1}{2}$.

6. Method according to claim 5, in which the phase-shifted signals from said one probe and signals from said other probe are summed and fed to a square-law detector.

7. Method according to claim 6, in which said square-law detector is synchronized with said cyclical phase shifting to output a signal approximately proportional to the difference in the amplitude of the signal corresponding to the two half periods of the phase shifting cycle.

8. Method according to claim 6, in which the signal is filtered after square-law detection by numerical filtering to output a signal which is approximately proportional to the difference in the amplitude of the signal corresponding to the two half periods of the phase shifting cycle.

9. Method according to claim 1, in which during the measuring, the two probes are displaced relative to one another to vary the common volume part.

10. Apparatus for measuring the temperature of a selected sub-surface volume of a body comprising at least two probes A and B adapted to be placed on or near the surface of the body to pick up thermal noise signals in the microwave range emitted by the body, said probes being positioned adjacent one another so that the volumes of the body from which the respective probes receive thermal noise signals in the microwave range overlap one another to provide a common volume part Vi from which both of said probes receive thermal noise signals in the microwave range and remaining volume parts Va and Vb from which only probes A and B respectively receive thermal noise signals in the microwave range and means for amplifying and correlating signals from said probes to correlate thermal noise signals in the microwave range received from said common volume part Vi while decorrelating thermal noise signals in the microwave range received from remaining volume parts Va and Vb and thereby accentuate the thermal noise signals in the microwave range emitted by said common volume part Vi with respect to the thermal noise signals in the microwave range emitted by the remaining volume parts Va and Vb from which said probes receive thermal noise signals in the microwave range.

11. Apparatus according to claim 10, in which said amplifying and processing means comprises a correlation type receiver to which outputs of said probes are connected in parallel and an amplifier-receiver for amplifying the output signal of said correlator.

12. Apparatus according to claim 10, in which said amplifying and processing means comprises means for shifting the phase of signals from one probe relative to that of signals from the other probe, means for summing the phase-shifted signals from said one probe and signals from said other probe and means for amplifying the summed signals.

13. Apparatus according to claim 10, in which said amplifying and processing means comprises means for shifting the phase of signals from one probe relative to that of signals from the other probe, means for summing the phase-shifted signals from said one probe and a square-law detector connected to the output of said summing means.

14. Apparatus according to claim 13, in which said phase shifting means comprises a cyclical phase inverter and in which said square-law detector is synchronzied with said cyclical phase inverter.

15. Apparatus according to claim 13, in which means is provided for varying the angle of shift of said phase shifting means.

* * * * *